J. BECKER.
FOCUSING CAMERA.
APPLICATION FILED JAN. 12, 1901.

1,178,475.

Patented Apr. 4, 1916.
6 SHEETS—SHEET 2.

Fig. 3.

Witnesses:

Inventor
Joseph Becker

J. BECKER.
FOCUSING CAMERA.
APPLICATION FILED JAN. 12, 1901.

1,178,475.

Patented Apr. 4, 1916.
6 SHEETS—SHEET 5.

Witnesses
Arthur L. Bailey
Belle S. Luckett

Inventor
Joseph Becker

Fig. 17

UNITED STATES PATENT OFFICE.

JOSEPH BECKER, OF WASHINGTON, DISTRICT OF COLUMBIA.

FOCUSING-CAMERA.

1,178,475.  Specification of Letters Patent.  Patented Apr. 4, 1916.

Application filed January 12, 1901. Serial No. 42,957.

*To all whom it may concern:*

Be it known that I, JOSEPH BECKER, a citizen of the United States, residing at Washington, District of Columbia, have invented a new and useful Improvement in Focusing-Cameras, of which the following is a specification.

The present patent application is identified for convenience of reference in my related applications and patents as Case B.

The present specification hereinafter makes specific references to my other related applications as follows: Case A, Serial No. 26,647, filed August 11, 1900; Case C, Serial No. 63,106, filed June 4, 1901; Case D, Serial No. 64,722, filed June 15, 1901; Case F, Serial No. 67,469, filed July 8, 1901.

The present invention consists in a specially compact form of "focuser attachment" of the type shown in Figures 33 and 57$^b$ of my said Case A.

In the present embodiment of my invention the camera element of the combination is a magazine camera of the type described in U. S. Patent No. 538,736 to Marchal and Joux, issued May 7, 1895.

The parts that I combine therewith to constitute my improved camera are so devised that they may readily be detached in order that the camera may be used either as a plain hand camera or in combination with my attachment operating as a combined focus and field finder.

My invention further consists in certain details of construction which will be particularly specified hereinafter.

In the accompanying drawings.

The combined focus and field finder comprises certain optical elements and certain mechanism. The optical elements are shown separately in diagram Fig. 9, as comprising a divergent lens, G, and two diagonally set mirrors L and M. Mirror, L, is fixed and mirror, M, is pivoted on an axis which appears in the diagram as a point, 13. The mirrors in this figure are shown parallel, as they must be when the camera is in focus on a very distant point. If no mirrors were present, lens G would form not far from its focal plane 50 the image $o''$ of a given object O. On the other hand the combination of lens and mirrors forms an image $o^3$ closer to the focal plane and slightly smaller than image $o''$. With the lens G of short focal length the difference in the size of the two images is not appreciable and the two images may, for all practical purposes, be considered as being equal and also as being in the same plane.

Figure 9:
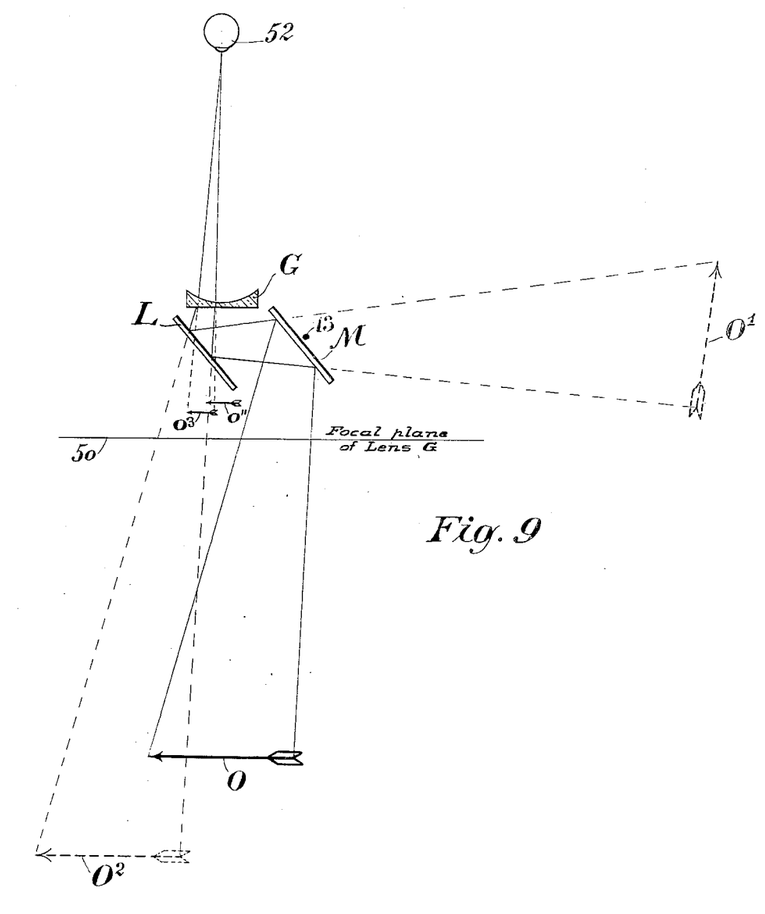
Fig 9 is a diagram plan of the optical elements which coöperate in forming the two finder images.

If mirror L is made transparent as well as reflecting an observer's eye at 52 will see the two images $o^3$ and $o''$ at the same time and will notice that the slightest rotation of mirror M will shift image $o^3$ and also that however close or distant object O may be the mirrors always can be set to make the images apparently blend into one. The observer will also notice that if the different parts of the optical combination remain fixed any motion of the object from or toward the camera will decrease or increase the apparent separation of the images. The coincidence of the images whenever obtained is therefore jointly dependent on the distance of the object and on the set of the auxiliary optical elements, which set is itself controlled by the motions of the camera lens if this be the movable element in the camera or by the camera plate or film holder if the lens be considered fixed.

For reasons given above I prefer to make mirror L opaque and small, so it will conceal only a part of image $o''$. In this case when coincidence is obtained by matching of the complementary parts of the two images the part of image $o''$ that is concealed by the opaque mirror L is completed by the part of image $o^3$ that is seen in L.

Figure 3:
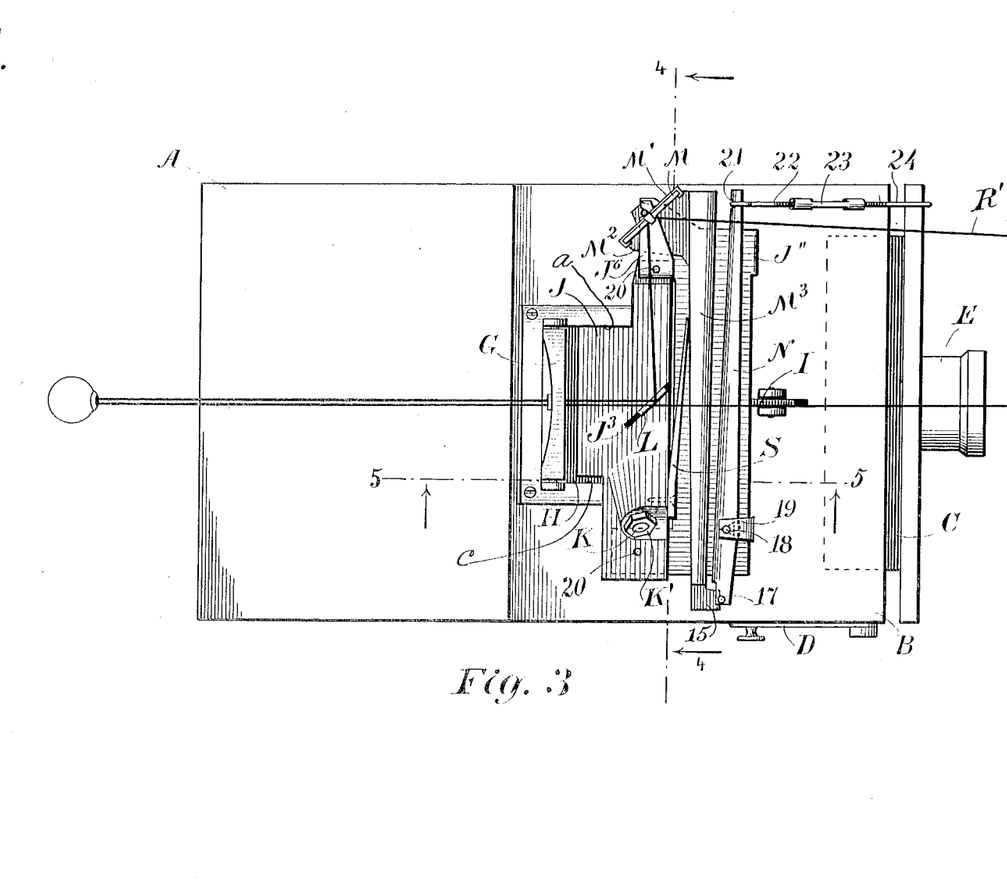
Fig. 3 is a plan view.

The one image $o''$ is formed by rays R, Fig. 3, that meet the focuser at one point, and the other image $o^3$ is formed by rays R', Fig. 3, which meet the focuser at a different point, the distance between the two points being virtually a base line and the auxiliary optical devices a range finder so combined with the camera that the range need not be known to the operator because the same is, by means of the mechanical elements, automatically translated for him into the corresponding camera extension. The mechanical elements with the optical elements, G, L and M, I mount on one base as an attachment for hand cameras in general, but in the attachment as shown in Figs. 1 to 5 the lens is omitted, because the attachment is specially intended for a camera which as manufactured is already provided with a finder lens such as I prefer to use.

Figures 1, 2:
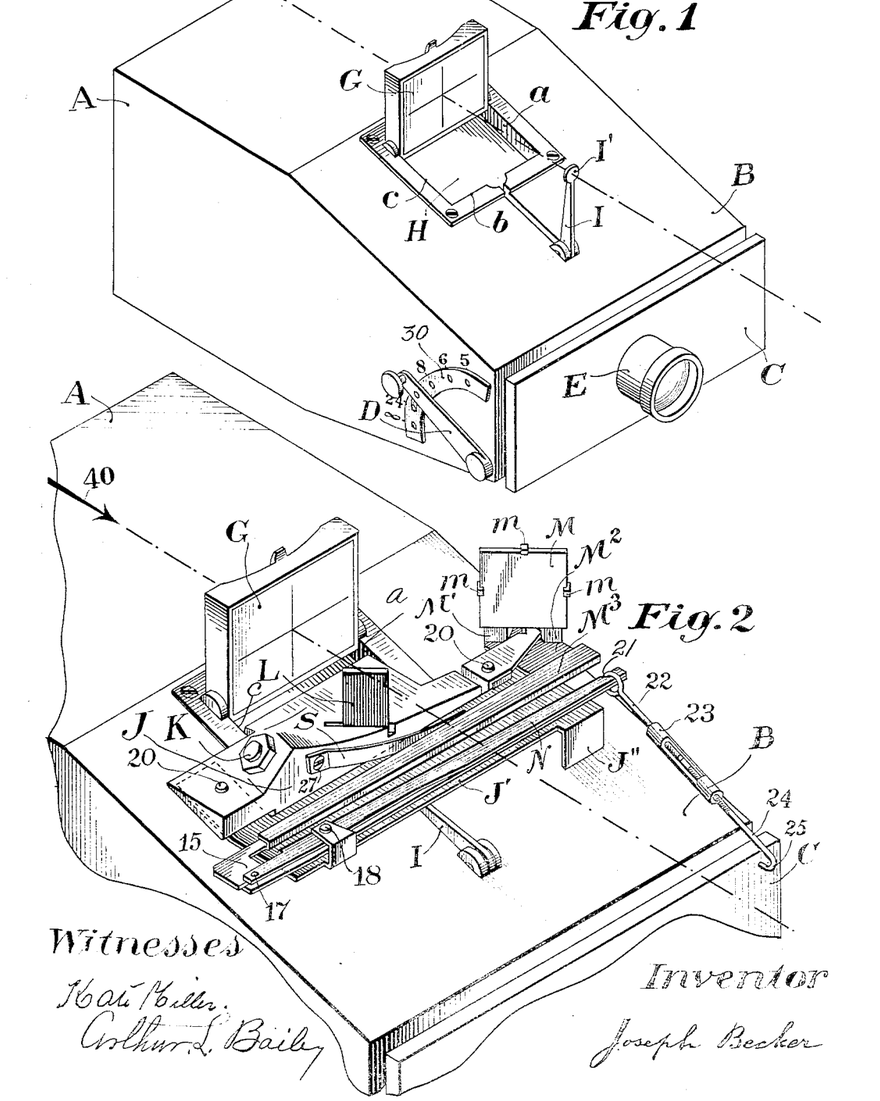
Fig. 1 is a perspective view of the special known type of camera which I use in the present embodiment of my invention.
Fig. 2 is a similar view of the same with my attachment mounted in operative relation thereon parts of the camera being broken away to permit the use of an enlarged scale.

The camera, briefly described, comprises a box A B, Fig. 1, of special shape, in the front end of which is mounted to slide the part C which carries the objective E. At the right is a small lever D which is used to set the part C farther in or out according to the distance of the object to be focused on; and to determine the proper set, without using my focusing attachment, the operator must first know, measure or estimate the actual distance of the object. In the path of the free end of lever D is a scale 30, graduated in object distances of 5, 6, 8, 12, 24 feet and infinity ($\infty$) and forming a curved focusing scale. In Fig. 1 the numeral 12 of the focusing scale is concealed under lever D.

On top, the camera carries a divergent lens finder G which is pivoted so it may be folded when not in use, into a rectangular recess H. There is also pivoted on top a small finger I carrying at its end a bead sight I' which, in combination with two cross lines on the finder lens, serves to center the image. The finder lens is held either opened up or closed down by a spring not shown, about in the same manner as the blade of a pocket knife in its handle; and finger I has a spring, also not shown, which tends at all times to keep it projecting, as seen in Fig. 1. When the parts are folded down, finger I, which is the first one to be lowered, projects into recess H under the finder lens and thus both parts are positively held in closed position.

It is in recess H that I mount my attachment, which in combination with the finder lens G constitutes my improved focusing finder as seen in perspective Fig. 2, taken from the same point of view as Fig. 1, but made on a larger scale to more clearly show details. Finger I in this form being not necessary, is held down by the attachment as it would be held by the finder lens.

The base of the attachment comprises a wooden block J and a sheet metal table extension J'. When the camera is held horizontally, as supposed in Fig. 2, the table J' is horizontal and in order that it be not bent down it is provided near one end with a vertical extension or prop J'' to bear directly on the camera box. The under part of block J is shaped as most clearly seen in the inverted view, Fig. 6. Near one end the block carries an inclined clamping bolt K, which may be drawn up through the block by a nut K', which action draws the bolt head against wall $c$ of recess H (see Fig. 4), whereas the pressure of the nut on block J forces the block itself strongly in the opposite direction against wall $a$.

Figure 4:
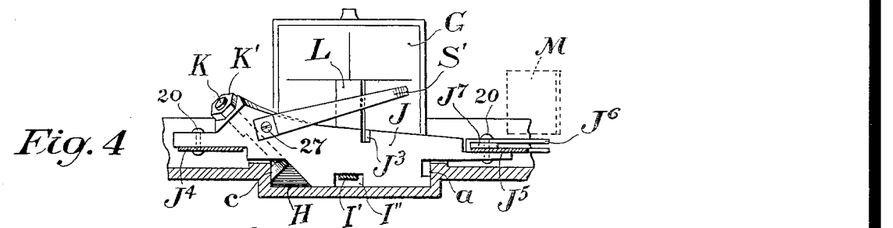
Fig. 4 is a detail front elevation with the adjacent camera parts sectioned on line 4—4 of Fig. 3.
Figure 6:
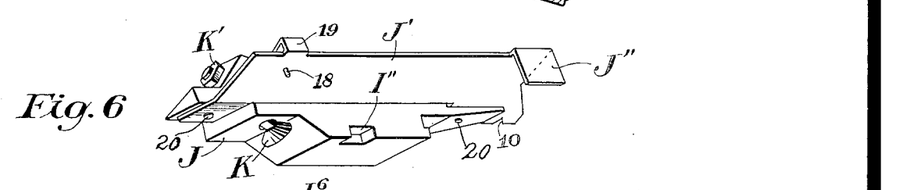
Fig. 6 is an underside front perspective view of the base upon which are mounted the mirrors and the main part of their operating gear.

In order that the block once removed may be reclamped exactly in its proper position with respect to the camera box A B, that is, exactly in the same place in recess H, the block, before and while the clamping action is applied, is held firmly pressed to bear on the bottom of recess H, against side wall $a$ (Fig. 4) and against the forward wall $b$ (Fig. 1). Recess I'', seen in Figs. 6 and 4, is intended to receive the bead sight and hold it down, because in the form shown the bead sight becomes unnecessary as explained later. But in certain cases the finger may be necessary.

Figure 5:
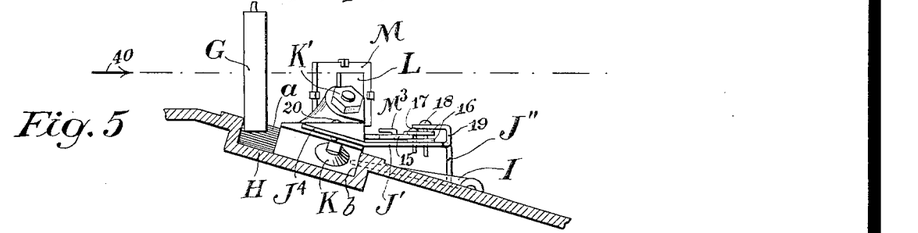
Fig. 5 is a detail side elevation with the adjacent camera parts sectioned on line 5—5 of Fig. 3.

In its upper surface block J has a diagonal kerf $J^3$, in which is firmly cemented a vertical mirror L, which faces so that its silvered back appears in Figs. 2, 4 and 5. This mirror L is preferably made and set as shown so the middle point of its upper edge Figs. 4 and 5, shall be on the central sighting line, in order that the sighting finger I, may be dispensed with when my attachment is used.

Figure 7:
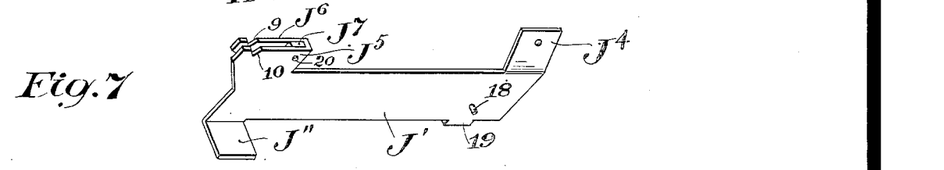
Fig. 7 is an underside rear perspective view of the sheet metal part of the base shown in Fig. 6.

The table J' has, as seen in Fig. 5, an extension J'', already described above, and as best seen in Figs. 4 and 7 two other extensions J$^4$ and J$^5$, which serve to connect table J' with the wooden part J of the base by rivets 20 (Figs. 2, 3, 4, 6). Extension J$^5$ itself has an extension J$^6$ which is bent back over J$^5$ and spaced therefrom as seen in Figs. 4 and 7 by a piece of sheet metal J$^7$. The free ends of these extensions J$^5$, J$^6$ have alined V recesses 9 and 10, Fig. 7, recesses which serve as bearings for a pivoted mirror M mounted to face mirror L.

Figure 8:
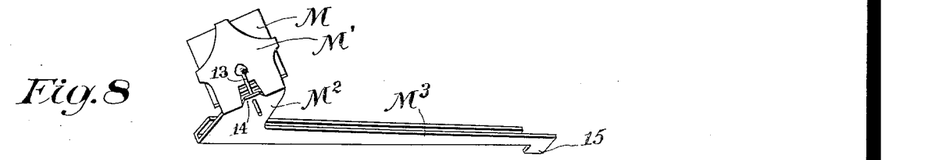
Fig. 8 is a similar view of the pivoted mirror and of the arm upon which the mirror is mounted.

Mirror M has a mounting of special shape, seen separately in Fig. 8, but most easily described in its proper place on the camera as comprising a vertical member M' and a horizontal member M$^2$. To the vertical member the mirror is clamped by three bent fingers $m$, Fig. 2. Vertically through the horizontal member M$^2$ and in the plane of M' of the vertical member, passes a pin or pintle 13, which is firmly soldered to the mounting so no motion shall be possible with relation thereto. This pintle 13 must be free immediately above M$^2$ and to provide for this M' is perforated, as seen in Fig. 8, where the perforation is made by stamping and leaving in the plane of M$^2$ a part 14 of the metal which would otherwise have folded up with M' and which now serves to steady the pintle. M$^2$ fits in between extensions J$^5$ and J$^6$ of the base and pintle 13 fits in recesses 9 and 10. The horizontal member M$^2$ is extended transversely of the camera in the shape of an arm M$^3$, made stiff by doubling the metal on itself. The extreme end 15 of the arm is left single to engage a lever N, Fig. 2, mounted to lie substantially parallel with arm M$^3$. Lever N is doubled by bending to increase stiffness and also to provide the end where it is engaged by extension 15 with jaws 16 between which extension 15 may be held pressed against a pin 17 fixed in the end of lever N. Lever N is fulcrumed on a pin 18 which is firmly held in vertical position by the bracket 19 bent up from an extension of table J'. The pin 18 being fixed, lever N is loose thereon and is therefore provided, for reasons to appear later, with an inverted V bearing, seen dotted in Fig. 3. The long arm of lever N has at its free end a second V bearing 21, Fig. 3, in which engages an adjustable link 22 to 25, Fig. 2, connecting lever N with the lens carrying frame C of the camera. This link comprises an eye rod 22, a turn buckle 23 and a hook rod 24, the hook 25 of which fits into a small recess in the outer face of frame C.

A spring S, shown in Figs. 2 and 3, by holding all the parts in working contact, completes the combination. This spring is pivoted to block J at 27, so it may be set up in the position S' of Fig. 4 to permit of separating or of re-assembling the parts. The combination of V bearings and a single spring placed as shown avoids lost motion at each and every part of the mechanism, a result which permits of securing in very cheap constructions great ease and precision of action, the precision being further insured by making the contacts of any two jointed parts symmetrical with respect to the plane of motion, so every pintle, shall have acting upon it two parallel forces in opposition to a third intermediate force. This feature of construction avoids any sluing tendency of the pins such as would be present if the pins were to project laterally from one part.

The advantage of the V bearing over the round bearing is especially apparent when the effect of a reversal of motion is considered. In the V bearing no displacement is noticeable but in a round bearing at least in one that is not too tight, when the motion is in one direction the pintle will roll from its normal position of rest into one extreme position and when the motion is reversed it will roll back to and through said normal position to an opposite extreme position.

When the desired focus indicating relation of the two images is that of coincidence the mirrors should be exactly parallel when the camera is in focus on an infinitely distant point. This condition fixes the position of arm M$^3$ and also the position of arm N and leaves nothing indeterminate but the length of link 21 to 25. By sighting on a very distant point and by shortening or lengthening the said link until coincidence of the two images of said point is obtained, the mirrors will be set as they should be for such distant point; and the apparatus will, furthermore, be exact for a second or close position of the object point, provided only the effective length of the radial mirror arm M$^3$ and the effective lengths of the two lever arms in lever N are what they should be for the focal length $f$ of the particular lens used. In determining these proportions it is only necessary to follow the general directions given in connection with Fig. 23 of my said Case A in the manner diagrammatically illustrated by the present Fig. 17.

Figure 17:
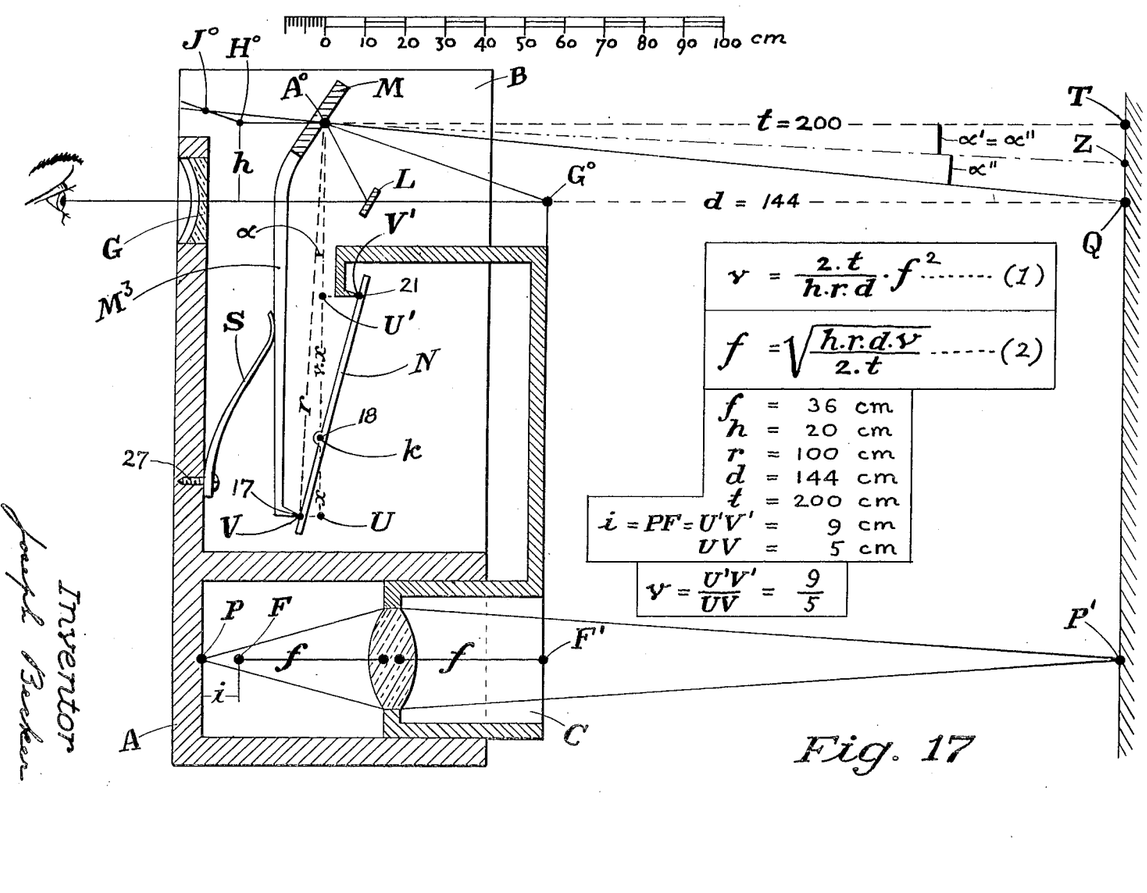
Fig. 17, with equations annexed as a part thereof, is a diagram specially arranged to represent clearly the different elements that enter into the computation of the velocity ratio determined by the ends 17 and 21 of lever N, Fig. 3, or the ends 17′ and 21′ of lever $n$, Fig. 10.

The combination shown in Fig. 17 is drawn to scale and is operative to secure correspondence between the camera and the mirrors for the object at infinity and for the close normal object plane P''T at distance A°T or $t$ equal 200 cm, from the camera.

Fig. 17 may be considered as a camera of the normal type, Fig. 3, opened up and spread out to show, drawn to scale, at a glance, all elements that enter into the computation.

The drawer C of the camera is shown set in focus on the point P' of the close object plane P'QT and the mirrors are set, for the same object plane, to secure coincidence for the object point Q.

The diagram QG°A°H°J° corresponds exactly to the diagram OGAHJ, Fig. 1, of my said Case A, and, in view of Fig. 4, Case A, we know that the inclination of mirror M to mirror L in Fig. 17 must be one-half of angle TA°Q. That is to say, it must be alpha $$\alpha = \frac{TA°Z}{2}$$

On the other hand, we see that the displacement of pin 21 is $$U'V' = PF$$

and from these two conditions it is easy to derive the almost exact equations 1 and 2 annexed to and forming part of Fig. 17, and in which $f$ is the focal length of the lens used; $h$ is base line of the range finder; $r$ is the effective radius of the pivoted mirror M; $d$ is the distance G°Q or F'P' of the object plane P'Q from the external focal plane of the camera lens; and $t$ is the distance of the mirror pivot A° from the same object plane P'T.

Figure 10:
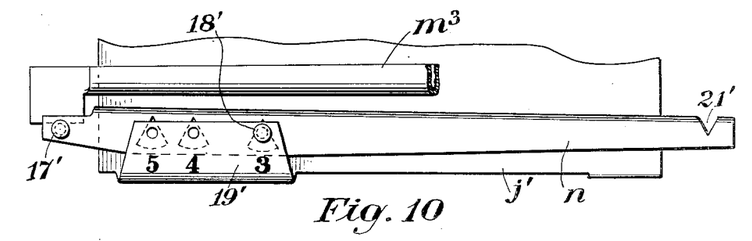
Fig. 10 is a partial plan view of a modified form suitable for any one of three different focal lengths.

To adapt the device to different lenses, it is sufficient to change the leverage in any suitable manner, as for instance by making pin 18 adjustable longitudinally of lever N. This construction is illustrated in Fig. 10 where three different bearings marked 3, 4 and 5 are shown, spaced to secure the velocity ratios 9, 16 and 25 necessary for three different focal lengths which are supposed to be approximately proportional to the numbers 3, 4 and 5. The parts $j'$, 17' 18', 19', 21', $m^3$ and $n$ of Fig. 10 correspond respectively to the parts J', 17, 18, 19, 21, M³ and N of the other figures. Changing the velocity ratio by displacement of pin 18' leaves the lever arms as long as they can be within the space allowed them, and thus the main object of my system of levers is preserved. The device therefore comprises two principal adjustments, one for varying the velocity ratio to adapt the device to the focus of the lens and the other to adjust the initial set of the pivoted mirror so as to get correspondence between the lens and the focusing finder for any one point and approximately also for all others.

Figure 11:
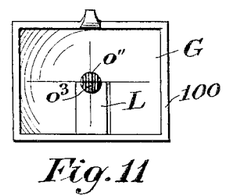
Fig. 11 is a rear view showing the finder as it appears to the observer when the lower movable part of the image is in a focus indicating position of apparent coincidence.
Figure 12:
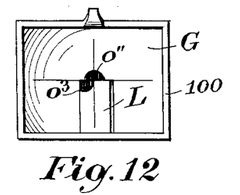
Figs. 12 and 13 are similar views showing the same movable image displaced in its path and indicating that the camera is out of focus, the lens being too far from the plate or film in Fig. 12 and too close to it in Fig. 13.
Figure 13:
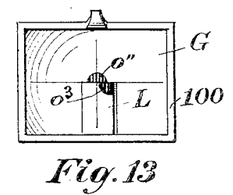
Figure 14:
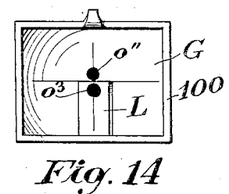
Figs. 14, 15 and 16 are views similar and corresponding to Figs. 11, 12 and 13, but showing image relations when the path of the movable image is offset to secure a focus indicating position of non-coincidence.
Figure 15:
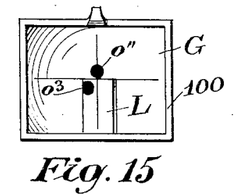
Figure 16:
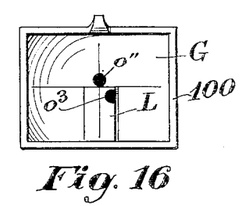

When the camera is to be used in photographing a point or has to be focused on a point, it is conceivable that it would be very difficult to so hold the instrument as to see complementary part of the point in the two images. In this case I prefer to set the mirrors so that the images instead of being brought into coincidence as in Fig. 12 when the camera is in focus shall really always remain separated but must be brought into vertical alinement as in Fig. 14 when the camera is in focus. This is done by simply setting the mirrors so they shall be a little farther apart at their upper ends than at their lower ends, or, which amounts to the same thing, so their surfaces produced will meet below the camera. The effect of this is to lower the image through an angle equal to twice the vertical angle formed between the two mirrors, which may still be considered as parallel in the horizontal direction. The image $o^3$ in its motions then still travels along a substantially horizontal path, but its path is lowered or offset so as to avoid the position of apparent coincidence. The focus indicating relations are substantially the same in the two systems, and the horizontal motions in the offset or lateral path of Figs. 14, 15, 16 are substantially the same as in the axial or diametral path of Figs. 11, 12, 13. In either system the operator may look upon the movable image $o^3$ as corresponding to his camera lens, and the right hand vertical bar 100 of the finder frame as corresponding to his camera plate or film, then when the image is as in Fig. 11 or in Fig. 14 the camera is in focus. When the image $o^3$ is too far from bar 100, as in Figs. 12 and 15, the camera lens is too far from the plate or film; and when the image $o^3$ is too close to bar 100 the camera lens is too close to the plate or film. The mirror L in Figs. 11 to 16 being seen through the lens should appear much narrower than shown in these figures, but the width was exaggerated for the sake of clearness.

While I have shown a preference for the short focus minus lens, G, which comes with the camera, I wish it clearly understood that the focus of the lens, G, may be as long or as short as desired, and may even be positive without changing the apparent relative position of the images. Whatever the focus of the lens may be, the two images will coincide only when the mirrors are set so that the single image, O², Fig. 9, shall be alined with the original object, O. A lens of infinite focus can be used, such lens being nothing more than a piece of plain glass which forms the image of an object coincident with the object itself. Of course, to changes in focus must correspond changes in dimensions to include the proper field. My attachment as shown herein will operate in combination with any type of finder to mutilate the image formed thereby and to remend the image by proper adjustments; therefore, I do not limit my claims to finders of the direct vision type.

I wish to call especial attention to the fact that part C in Figs. 1 and 2 may have considerable lateral motion, such as is present in most cameras, especially the cheap ones, and that such motion will have no appreciable effect on the operation of the focusing finder.

NOTE 1.—The camera of Figs. 1 to 8 is the one that is photographically reproduced in the blue print annexed to and forming a constituent part of the six-page affidavit which I placed on record in the Patent Office October 20, 1902, as part of paper 13 in my said Case D, Serial No. 64,722, filed June 15, 1901; and the present application, Case B, is the one referred to in lines 10 to 13, page 5, of the said affidavit.

NOTE 2.—Every detail in Figs. 2 to 9 is, for historical reasons, purposely shown substantially as originally constructed with my own hands; and, therefore, the present invention should be considered as capable of wide departures from the form illustrated; especially so in view of the disclosures made in my said earlier application, Case A.

NOTE 3.—The focuser, being an approximately constant velocity ratio focuser, can only be used to secure two-point correspondence with the camera lens and is subject to the error $qq'$ noted in Fig. 23 of my said Case A.

NOTE 4.—All claims on the focuser as a removable attachment are made in my said Case F.

NOTE 5.—The special means used for laterally offsetting the movable image in its focus indicating position to any desired degree is shown and claimed in my said Case C.

NOTE 6.—Where the lens has the focal length that corresponds to the basic focal length $f$ of the focuser as determined by equation 2, Fig. 17, then a variation in the dimension of the single structural unit 22 to 25, Fig. 3, is sufficient to secure correspondence between the camera and the focuser for two distances of the object point, without using the continuously variable velocity ratio adjustment shown at 90 in Fig. 33 of Case A.

What I claim as my invention is:—

1. The combination with a photographic camera, of a range finder comprising two mirrors, the one fixed and the other movable, with double substantially parallel lever transmission gear between such movable mirror and the relatively movable camera part, and an adjustment to secure desirable relative inclination of the mirrors for two different extensions of the camera.

2. The combination with a focusing attachment containing pivoted parts of V bearings for the pintles and a spring for keeping the pintles pressed into the V bearings.

3. The combination with a focusing attachment containing pivoted parts of symmetrical bearings comprising V bearings on the one part and a pintle on the other and a single spring for keeping the combination in working contact at all points throughout.

4. A focusing attachment containing parts having pivotal relation determined by pintle and V bearing connection with yielding means for keeping the parts in operative relation.

5. The combination of a range finder comprising two mirrors, the one fixed and the other movable, with the focusing mechanism of a camera, and a finder, such finder consisting in a divergent lens located in the direct line of sight between the eye mirror and the observer's eye, substantially as and for the purpose described.

JOSEPH BECKER.

Witnesses:
SIDNEY MANN,
JOHN W. WHALER.